United States Patent [19]
Dein et al.

[11] Patent Number: 5,297,277
[45] Date of Patent: Mar. 22, 1994

[54] APPARATUS FOR MONITORING DATA TRANSFERS OF AN OEMI CHANNEL INTERFACE

[75] Inventors: Dennis A. Dein, Vestal, N.Y.; Hugh C. Holland, Brackney, Pa.; Robert J. Kammerer; Reynold G. Valdez, both of Endicott, N.Y.

[73] Assignee: International Business Machines Corporation, Armonk, N.Y.

[21] Appl. No.: 575,576

[22] Filed: Aug. 31, 1990

[51] Int. Cl.$^5$ ............................................. G06F 11/00
[52] U.S. Cl. .................................. 395/575; 371/16.5; 371/19
[58] Field of Search ................. 395/575; 371/16.5, 19, 371/29.1

[56] References Cited

U.S. PATENT DOCUMENTS

| | | | |
|---|---|---|---|
| 4,477,873 | 10/1984 | McCarley | 364/200 |
| 4,611,281 | 9/1986 | Suko et al. | 371/29.1 X |
| 4,720,782 | 1/1988 | Kovalcin | 364/200 |
| 4,723,270 | 2/1988 | Okamoto et al. | 379/113 |
| 4,751,670 | 6/1988 | Hess | 364/900 |
| 4,791,563 | 12/1988 | Kling | 364/200 |
| 4,802,167 | 1/1989 | Sawaya et al. | 371/25.1 |
| 5,058,114 | 10/1991 | Kuboki et al. | 371/16.5 X |

FOREIGN PATENT DOCUMENTS 0010191 9/1979 European Pat. Off. .
0260502 8/1987 European Pat. Off. .

OTHER PUBLICATIONS

IBM Technical Disclosure Bulletin, vol. 31, No. 7, Dec. 1988.

Primary Examiner—Charles E. Atkinson
Assistant Examiner—Ly V. Hua
Attorney, Agent, or Firm—Pollock, VandeSande & Priddy

[57] ABSTRACT

A channel adapter monitoring device for tracing OEMI channel data and tags. The device is configurable via a support processor and supervisory microprocessor. A trace array memory stores events identified by a configurable write register. A timer is provided to permit a time stamp entry to be made with each data entry of detected events. The microprocessor can address the trace memory over an MMIO bus and recover the stored data for analysis.

17 Claims, 3 Drawing Sheets

APPARATUS FOR MONITORING DATA TRANSFERS OF AN OEMI CHANNEL INTERFACE

RELATED APPLICATIONS (1) U.S. patent application Ser. No. 07/575,578, filed Aug. 31, 1990, EN990-027;

(2) U.S. patent application Ser. No. 07/575,575, filed Aug. 31, 1990, EN990-029;

(3) U.S. patent application Ser. No. 07/575,593, filed Aug. 31, 1990, EN990-030;

The present invention relates to an apparatus for monitoring the data transfer between an OEMI channel interface and a channel adapter. Specifically, a device for providing a trace function for data transfers between an OEMI channel interface and channel adapter is described.

Large-scale computing systems are often interfaced with each other through channel adapters. A given channel adapter will interconnect one channel of one computing system with a second channel of another computing system. These connections are usually time-shared connections, wherein for only a brief interval of time, each channel is connected together to do a data transfer.

When problems result from attempting data transfers between a channel and a channel adapter, an analysis of data transfers occurring across the boundary of an OEMI channel and its adapter is useful to diagnose a fault condition which may have occurred. Equipment is available in the industry for inserting in the OEMI channel cable to monitor the various channel bus and tag conditions occurring between the OEMI channel and the channel adapter.

In systems which employ multiple OEMI channels interconnected through channel adapters, an effective diagnosis of a data interchange between a respective channel and its adapter may require multiple pieces of channel interface monitor equipment. The equipment does not provide for correlation of data occurring at one channel interface, with respect to data which may be occurring at a second channel interface. This correlation of data would be very useful in diagnosing a problem which occurs from the data exchange between channel adapter and OEMI channel.

Additional to the need for such capital equipment is the necessity for trained personnel who can install the channel interface monitor to debug complex channel I/O problems.

To be effective, such channel interface monitoring devices should have a configuration which is user controlled, as well as a user controlled time base for time-stamping monitored events. Further, a channel interface monitor which is implemented as part of the channel interface is desirable to avoid the need for service personnel to spend time making and breaking a physical connection of a channel interface monitor to the interface. Imbedding a channel interface monitor into the channel adapter or channel interface would advantageously avoid these difficulties.

SUMMARY OF THE INVENTION

It is an object of this invention to provide a configurable channel interface monitor on a channel adapter interface associated with an OEMI channel.

It is a more specific object of this invention to provide a user-controlled channel monitor which permits the storing and time-stamping of channel events which occur between a channel interface and an OEMI data channel.

These and other objects of the invention are provided by a channel interface monitor which is imbedded as part of a single chip channel interface. The monitor is configurable by a connected control microprocessor. The microprocessor, through a memory mapped I/O port, sets up the channel interface monitor with data identifying which events are to be monitored. These channel events are detected, and a trace memory is provided for storing each of the events selected for monitoring. The trace memory may be accessed through the MMIO port for analysis.

In carrying out the invention, a plurality of configuration registers are provided which may be loaded with data via the MMIO port. These configuration registers are used to identify events which are to be written to the trace memory, to identify events for triggering a timer associated with the monitoring operation, and for identifying to a second channel adapter the occurrence of a certain event on the first channel adapter.

In accordance with a preferred embodiment, the data bus of the incoming OEMI channel is monitored, along with the OEMI tags associated with the channel. These events may be written to the trace memory, along with a time stamp, identifying when the events occurred. Once the trace memory has been loaded with monitored events, the supervisory microprocessor may address the trace memory to retrieve the loaded data for analysis. A LAN interface is provided to the microprocessor, permitting the data to be downloaded to a support processor for presentation in a convenient format for debugging analysis.

DESCRIPTION OF THE PREFERRED EMBODIMENT

Figure 1:
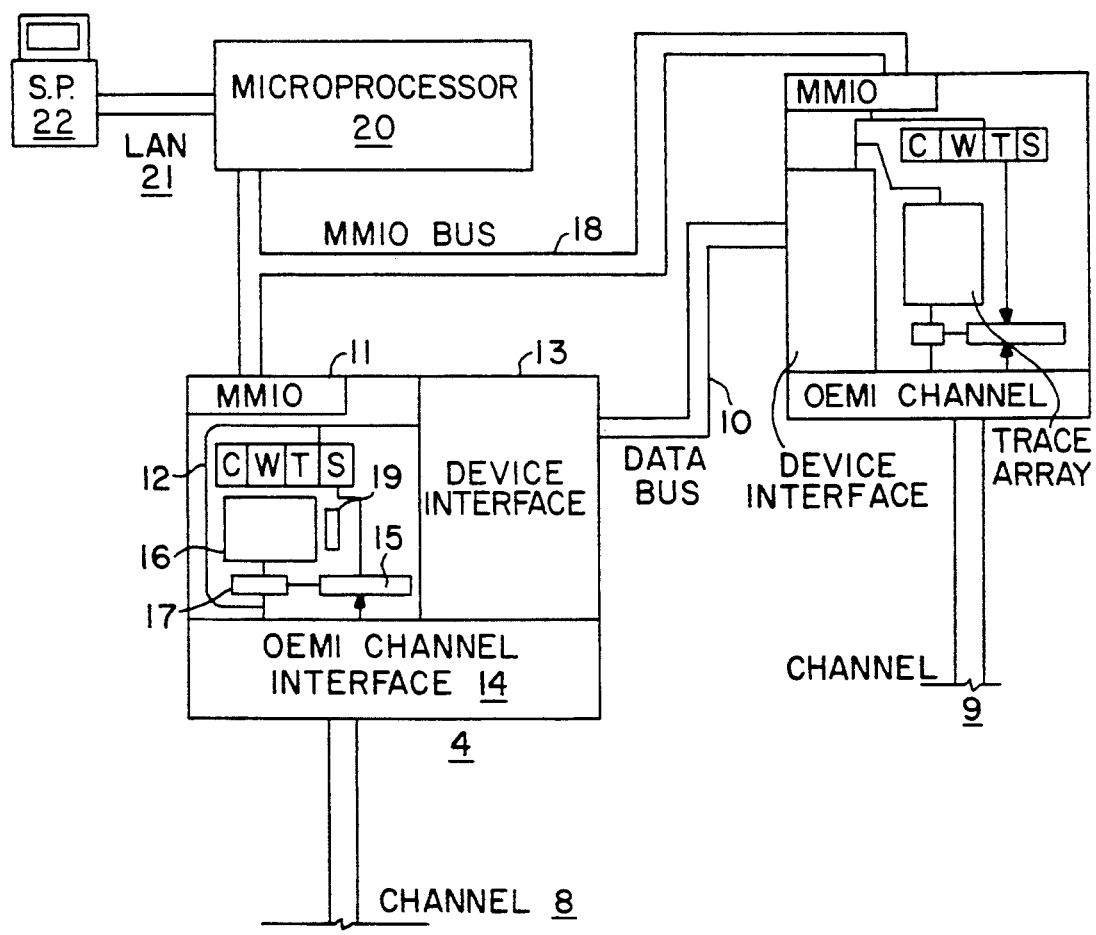
FIG. 1 illustrates the channel interface monitor imbedded in first and second channel adapters.

Referring now to FIG. 1, there is shown a pair of channel adapters for interconnecting to OEMI data channels 8 and 9. The channel adapters, 4, 5, being identical in structure, include an OEMI channel interface 14, which will provide all the necessary protocol signals for establishing a session with the channel 8 and a channel 9 over a data bus 10. In the channel adapters 4, 5, illustrated in FIG. 1, it is assumed that the data bus 10 will be assigned on a time division multiplexed basis to provide a data path between the channel 8 and channel 9. During the time in which the data path represented by data bus 10 is connected between channels 8 and 9, device interface 13 on each of the channel adapters 4, 5, will be seen as a pair of devices interconnected by the data bus 10. The pair of devices for the time increment allotted to connect channels 8 and 9 establish a communication with each of the OEMI channel interfaces 14.

Associated with each of the channel adapters 4, 5, is a memory mapped input/output port 11. The memory mapped input/output (MMIO) 11 port is connected to a supervisory microprocessor 20. A trace memory 16 is provided which is a memory capable of storing as many events as it is desired to monitor. The trace memory 16 is controlled by a plurality of registers 12 which may be programmed via the MMIO port 11.

The microprocessor 20 can select which events on the OEMI channel interface 14 are to be recorded and stored in the trace memory 16. Along with these events is a timer 15 which can time-stamp each of the events stored in the trace memory 16 permitting the time between events to be calculated. A trigger register is associated with the configuration registers 12 for providing a signal to another channel adapter, indicating that a certain event had been detected on the first channel adapter. This will permit the second channel adapter to begin timing events with respect to a reference synchronization time indicated by the first adapter.

Microprocessor 20 may, upon command from a support processor 22, via a LAN 21, read the contents of the trace memory array 16. The address register 19 associated with the trace memory array, may be addressed via the MMIO port, and the contents of the trace memory array for each address location is supplied to an output register 17. The output register 17 is, in turn, connected to the MMIO port, providing the ability to transfer the memory contents over the MMIO bus 18 to microprocessor 20.

The available data may then be transferred via LAN 21 to a support processor 22. Software within the support processor 22 may conveniently format and display the trace data for analysis.

Figure 2:
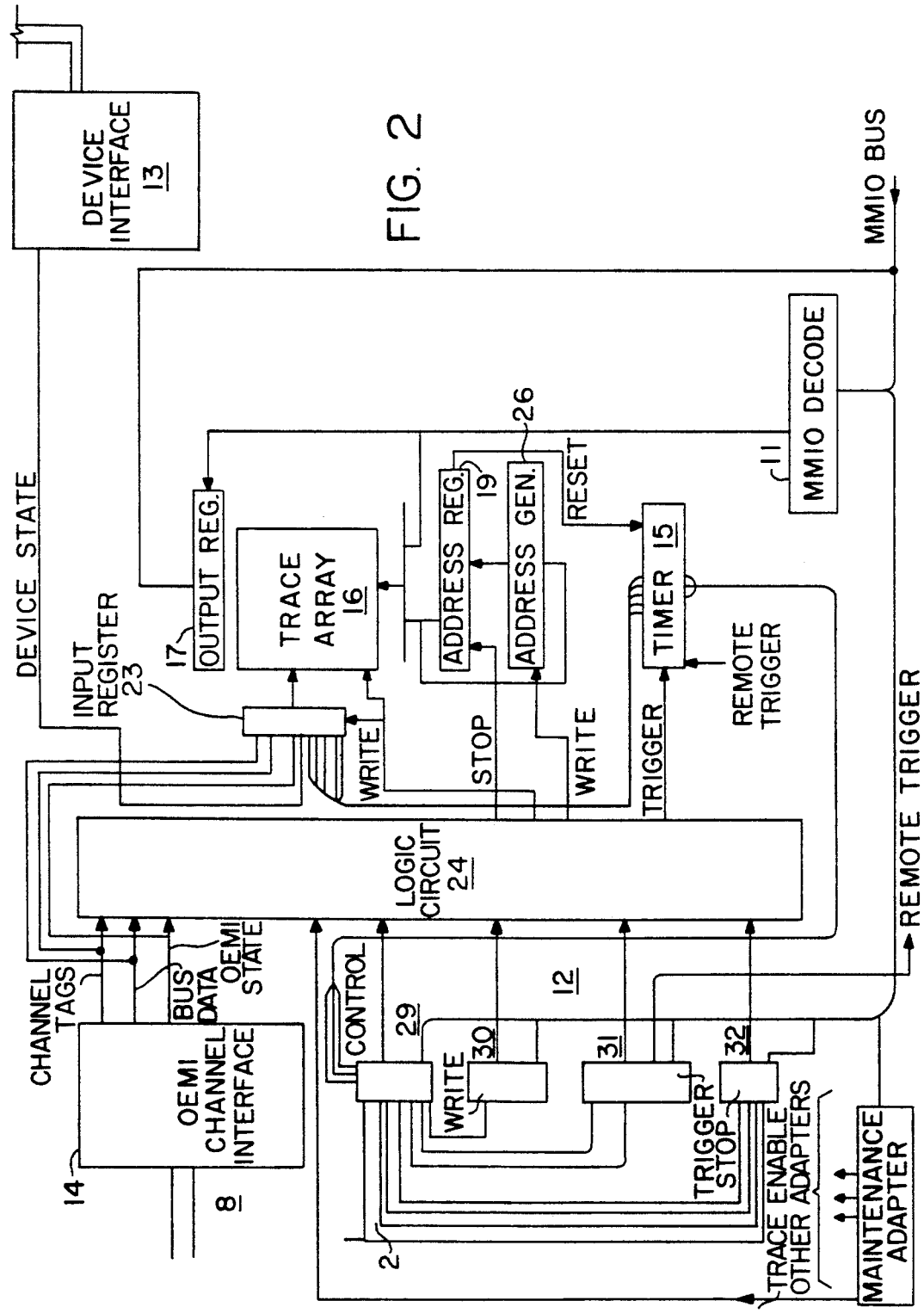
FIG. 2 illustrates in detail the channel monitoring apparatus in accordance with a preferred embodiment of the invention.

Referring now to FIG. 2, a detailed illustration of the hardware used to form the channel monitoring apparatus is shown. The OEMI channel interface 14 represents that circuitry, common to any OEMI terminating device, which will provide the OEMI bus data, channel tags and an OEMI state indication to a connected interface. The OEMI channel tags and its various states are more particularly described in various documents, such as "IBM/360 and System/370 I/O Interface Channel to Control Unit Original Equipment Manufacturers' Information". In these documents, there is described all the information necessary for establishing a session between an OEMI channel and the OEMI channel interface.

In accordance with a preferred embodiment of the invention, the various channel tags and bus data, as well as the OEMI state, are stored in a trace array memory 16 when a particular identified set of conditions are detected as being present in the logic circuit 24. The conditions which are detected as events to be stored in the trace array memory 16 are identified in the write register 30. The write register 30 is compared with the conditions existing on the OEMI channel interface, and a WRITE command issued to the trace array memory 16 when the event occurs. A timer 15 is shown which also provides an input signal to the input register 23 of the trace memory array 16. Thus, each data entry written from the input register 23 to the trace array 16 includes a time stamp, useful in analysis of the recorded data. An address register 19 and address generator 26 are incremented at each WRITE command, thus presenting a new address to the trace array memory 16 once a data entry has been stored in the trace array memory 16.

Control over the monitoring function is accomplished by the control register 29. The control register 29 may be loaded with data from the MMIO interface 11 under control of the supervisory microprocessor 20.

The first seven bits of the control register data identify the resolution for the timer 15. The trace timer 15 is a six bit timer, having an overflow bit. The timer 15 information is entered into the array as previously explained, each time a WRITE command is received by the trace array 16. The value of count divide data associated with the timer 15 defines the resolution of the trace timer. This resolution may be changed in 256 increments, the greatest resolution being a single clock cycle time for the channel adapter logic.

The trigger register 31 is controlled by two other bit positions of the control register 29. These bits, once set, identify the beginning of a timing interval for the timer 15 upon the sensing of specific channel tag data produced from the OEMI channel interface 14. One of these bits, when set, will cause the trigger register 31 to generate a remote trigger signal to another channel interface to enable its timer 15. A second bit received by the trigger register 31, when set to a 1, will produce a trigger condition whenever there is a match between all the bits that are set in the trigger register 31 from the microprocessor 20, and all the OEMI tags coming in from the OEMI channel interface 14. When set to a 0, there is a trigger condition whenever there is a match between any of the bits set in the trigger register 31 and the OEMI tags of the channel interface 14.

A bit from the control register 29 is applied to the write register 30. When this bit is set, there is a WRITE command generated for the trace array 16 each time there is a match between all the write register 30 bits, set from the microprocessor 20, and the OEMI channel interface channel tags. When a 0 is set for this one bit, a write condition exists whenever there is a match between any of the channel tags bits and the contents of write register 30.

The stop register 32 receives four bits from the control register. The first of these bits will stop all tracing when set as soon as the trace address wraps back to 0. This would be the address of address register 19, indicating that the trace array 16 is full.

When this bit is set to 0, tracing will continue until the microprocessor disables it, or one of the other stop conditions are met, as determined from the stop register 32.

A second bit control line to the stop register 32 will, when set, stop all tracing on the channel adapter if an error is detected on the channel adapter. This requires access to other data not shown in FIG. 2, but which can be used to compare with the stop register bit position to determine stop condition from an error generated condition. When set to zero, tracing will continue, even in the face of an error condition until one or more other bits in the stop register 32 identify a stop condition.

A third bit of the control register provides the stop register with a control bit which, when set to 1, will result in a stop of the tracing activity, when the event identified in the stop register 32 downloaded from the MMIO bus, has been detected by logic circuit 24. When the bit is set to 0, tracing will continue until the microprocessor 20 sends a disable command to the channel adapter.

A fourth bit from the control register, when set to 1, generates a stop condition, when there is a match between all the OEMI tags on the interface and all the tag data set in the stop register 32 from the microprocessor 20. When set to 0, a stop condition is generated whenever there is a partial match between any of the channel tag bits and the event bits set in the stop register 32.

The remaining bit positions for the write register 30 define an event representing an OEMI tag condition on which the trace array 16 is to be written with channel tags and bus data, each time the write condition is detected. As mentioned, the write register 30 works in conjunction with one bit from the control register 29. The WRITE command is supplied to the address generator 26 and input data register 23, when the logic circuit 24 detects the channel tag condition set in the write register 30. In the preferred embodiment of the invention, the trace array 16 will continue to be written each time the event is detected, with the channel tag, channel bus data and time stamp from the timer 15. It will be recalled, that the timer 15 starts running at the time the trigger register 31 indicates a timing interval is to begin.

The trigger register 31 provides an event detection for enabling the timer 15 to begin a counting interval, as well as depending on a control bit received from the control register 29, enabling another channel adapter to begin timing events, which will synchronize the timing between trace functions carried out on different channel adapters.

The trace stop register 32 provides a trace condition, stopping the trace array memory 16 address register 19, when a stop condition is detected in the logic circuit 24. The logic circuit 24 compares the microprocessor supplied stop event in stop register 32 with the channel tag data from the OEMI channel interface to effect a stop of the trace function.

The address register 19 receives the address from address generator 26 during a WRITE command issued by the logic circuit 24. The array address is automatically incremented to the next address after every trace entry. When the address is at a maximum, which is 63 in the preferred embodiment, following the data input at the maximum address, there is a wrap bit set in the trace address register 19, indicating that the address has wrapped back to 0. This address can be reset to 0 when the maintenance adapter 33 deactivates the trace enable signal.

The trace array timer 15 is a six bit counter having an overflow bit. The time base is variable in accordance with data received from the control register 29. The timer 15 resets each time there is an event entered into the array, as identified by a change in the address register 19 contents.

Figure 3:
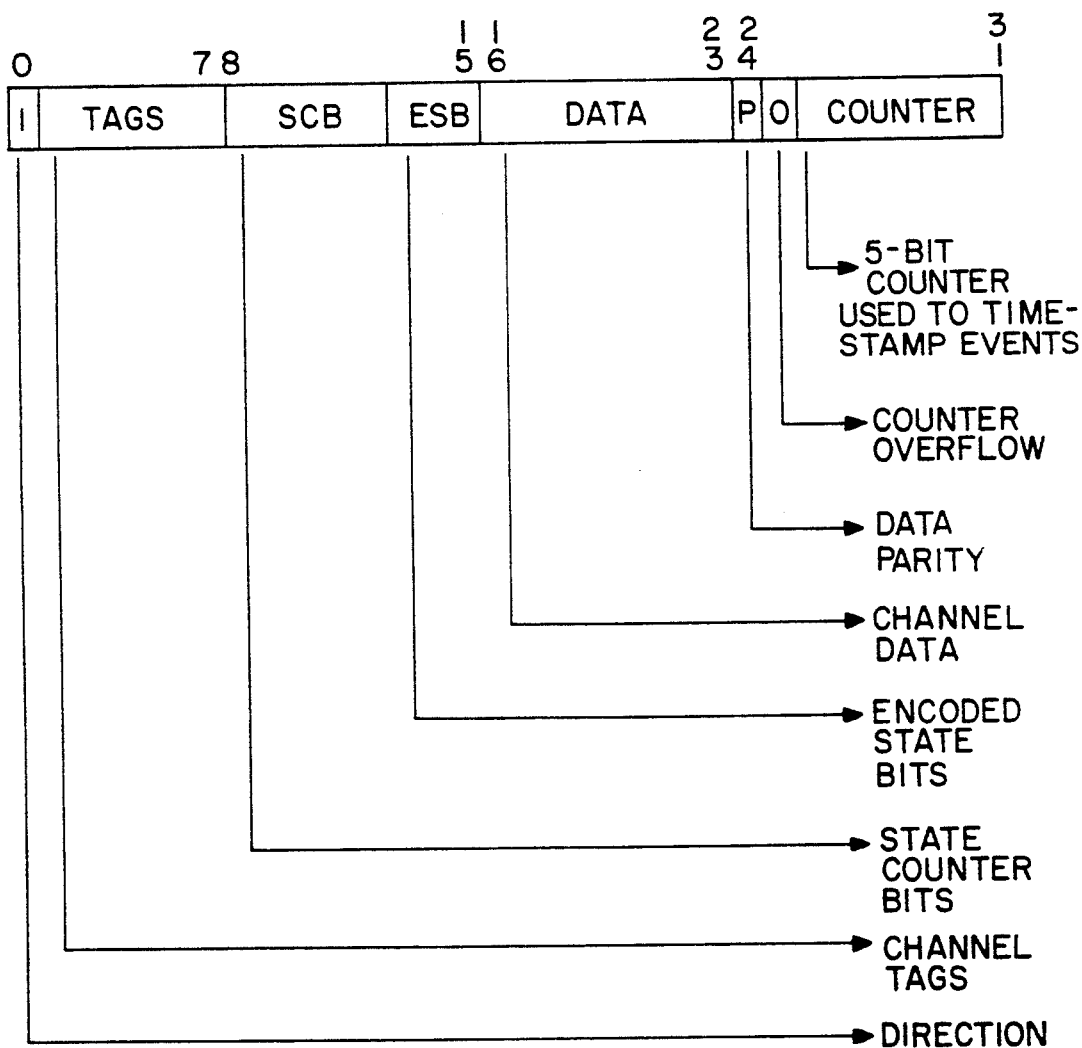
FIG. 3 illustrates the physical data layout of the trace array.

Referring to FIG. 3, there is shown a format for the data entered at each address of the trace array memory 16. The trace array 16 is configured to be a 64 by 32 bit logical array to store data relating to the operation of the OEMI interface.

The trace array contains the following information. As seen in FIG. 3, a first bit identifies the direction of data as either being inbound or outbound over the OEMI channel interface. This bit constitutes one of the tags decoded from the OEMI channel interface.

The remaining tags are shown which are provided as part of the OEMI protocol, more of which can be found in the aforesaid documents relating to IBM/360/370 I/O interface devices. A state counter associated with the OEMI channel activities also has bits stored as part of the data of interest during channel monitoring. The eight (8) channel data bus bits are also included in the trace array memory 16. Data parity for this channel data is also provided and stored in the trace array memory 16. The time stamp signal provided by timer 15 comprising a 5 bit count representing the time interval between trace events is stored, along with an overflow bit if present, in the remaining six bits of the trace array memory 16.

Thus, it can be seen that after going through a trace interval, data is available for analysis, illustrating the precise conditions which occurred on the OEMI channel interface, and the respective time these conditions occurred.

Also shown are coded state bits from the device interface 13. The device interface 13 essentially simulates a device which represents a connection between two channel adapters. The device interface 13 will produce a device state as part of its protocol operation which may also be recorded in the trace array 16, along with the sensed OEMI channel interface information. Thus, it can be seen that not only may the OEMI channel interface information be traced, but additional information regarding the device interface 13 may also be monitored and analyzed.

The foregoing arrangement for monitoring the performance of a channel adapter will now be described with respect to a typical monitoring scenario. Initially, a support processor 22 will identify each of the events for the write, trigger and stop registers, 30, 31 and 32. As was explained with respect to the control register 29, certain data bits in the control register 29 will effect the write, trigger and stop operations. The requisite data for these registers is downloaded over the LAN 21 to the microprocessor 20. Using the MMIO port, microprocessor 20 will then address each of the registers 29-32 to set up for a trace of a given channel event. This may be done while the channel adapter is still in use, using any available idle time on the MMIO bus 18 to configure the channel monitor registers 29 through 32.

The maintenance adapter 33 decodes an MMIO WRITE command from the microprocessor 20 to enable the logic circuitry 24, and the address register 19, as well as the trigger register 31.

The trigger register 31 will then establish when the trace events are to be monitored. At the first indication that a condition meets the trigger register 31 criteria, timer 15 will be enabled to begin timing a monitor interval. The subsequent events, detected by logic circuit 24 on the OEMI channel interface will determine which events have transpired for recording in the trace array memory 16. Thus, until the stop register 32 or microprocessor 20 with a superceding command stops the trace function, trace array memory 16 will compile data in accordance with FIG. 3 for analysis.

At the conclusion of the trace operation, when a wrap-around of the address generator occurs, or prior to such time, an interrupt may be sent back through the MMIO bus 18 to the microprocessor 20, identifying that the trace array 16 is full. At this time, the microprocessor may address the trace array memory 16, via the MMIO bus 18, and read the contents thereof through output register 17. Output register 17 will sequentially provide stored data of the 32 memory positions back to the microprocessor 20. Using software commands from the system support processor 22, these data entries may be downloaded to the support processor 22. Conventional data processing routines in the support processor 22 permit the data to be formatted in a manner for visual presentation on the support processor 22 monitor.

A complete set of trace data is available to the support processor 22 from the channel adapter channel monitor. If another channel adapter had been enabled to also monitor traffic via its OEMI channel interface by virtue of a remote trigger being supplied to its timer 15, then this data as well could be compiled in the microprocessor 20, using an MMIO address over the address bus 18.

Thus, with respect to one embodiment, there has been described a channel interface monitor which may be implemented as part of a channel adapter, and is available for monitoring various events occurring over the OEMI channel interface. Those skilled in the art will recognize yet other embodiments described by the claims as follow.

Having thus described our invention, what we claim as new and desire to secure by Letters Patent is:

1. An apparatus for recording data events on a channel interface for a OEMI data channel comprising:
   a control register connected to receive commands identifying data bus events to record,
   a write register connected to receive a set of bits corresponding to OEMI tag bits which identify a write sequence, and connected to said control register for further identifying alternate selections of said tag bits;
   a logic circuit for comparing events on said OEMI data channel with said write register contents; and,
   a trace memory for storing OEMI channel events detected by said logic circuit which are identified by said write register contents.

2. An apparatus according to claim 1 further comprising a timer for timing each interval between events written to said trace memory, said timer being connected to said trace memory for recording with each event an event time.

3. An apparatus according to claim 2 wherein said timer is connected to receive a command identifying the resolution of said timer.

4. An apparatus according to claim 1, further comprising a trigger register connected to receive a command identifying an OEMI event, and connected to said logic circuit for initiating a timing sequence when said OEMI event is detected.

5. An apparatus according to claim 4, wherein said control register is connected to said trigger register identifying alternate selections of said OEMI events.

6. An apparatus according to claim 1, further comprising:
   means for addressing said trace memory in response to a command received over a bus connected to a microprocessor; and
   means for transferring said trace memory contents over said bus to said microprocessor whereby said OEMI events are available for analysis.

7. An apparatus for monitoring OEMI channel activity on a channel adapter of a multichannel interface comprising:
   a control register for storing commands for controlling the monitoring of said channel activity, including the identity of subsets of channel events for monitoring;
   a write register for identifying channel events for recording under control of said control register;
   a logic circuit connected to said OEMI channel and said write register for initiating a WRITE command when said OEMI channel events agree with said write register contents;
   a programmable trace timer for identifying the time of the generation of WRITE commands;
   a bus connected to said control register and said write register;
   a microprocessor for supplying commands to said registers over said bus; and,
   a trace memory for recording said events under control of said WRITE command, said trace memory storing with each event the time the event occurred.

8. An apparatus according to claim 7, further comprising:
   address means connected to said trace memory and to said bus, permitting said microprocessor to address said trace memory contents; and,
   data transfer means for transferring said memory contents to said microprocessor permitting said channel performance to be analyzed.

9. An apparatus according to claim 8 wherein said write register generates a WRITE command when all of said channel events are identical with said write register contents or when any of said channel events are identical with said write register contents, depending on the state of said control register.

10. An apparatus according to claim 7 further comprising means for generating an interrupt to said microprocessor when said trace memory is full.

11. An apparatus according to claim 7 further comprising a trigger register connected to said bus for receiving a command identifying an OEMI channel event and connected to said logic circuit for signalling another channel adapter that said OEMI channel event has been detected.

12. An apparatus according to claim 7 further comprising:
   an address generator for incrementally addressing said trace memory in response to each WRITE command, and providing a reset signal to said trace timer following each time a memory location is written.

13. An apparatus for recording data events of an OEMI channel connected to a channel adapter, comprising:
   a control register connected to an MMIO bus for receiving commands identifying events to be monitored on said OEMI channel;
   a write register connected to receive a set of data bits from said MMIO bus identifying a set of OEMI events, and to receive a control bit from said control register;
   a tracer timer for generating a time stamp;
   a logic circuit connected to said OEMI channel and to said write register for detecting the occurrence of OEMI events identified by said write register; and,
   a trace memory connected to store information on said OEMI channel which occurs when said logic circuit detects said occurrence, and to store a timer stamp provided by said trace time with said information.

14. The apparatus of claim 13 wherein said control bit supplied to said write register controls whether information is to be stored in said trace memory based on a partial match between the contents of said write register and said OEMI events, or based on whether a full match between said write register and said OEMI events has occurred.

15. The apparatus of claim 13 further comprising a stop register connected to receive data from said MMIO bus, and connected to said logic circuit, said logic circuit generating a signal for inhibiting said trace memory from storing additional data when conditions on said channel match said stop register data.

16. The apparatus of claim 14 further comprising a trigger register connected to said MMIO bus for receiving data identifying an OEMI event, and connected to said logic circuit, said logic circuit generating a trigger signal for said trace timer when an event detected on said OEMI channel matches an event identified by said trigger register data.

17. The apparatus of claim 16, wherein said trigger register enables a timer associated with a second channel adapter to begin timing a monitor interval for a second channel.

* * * * *

UNITED STATES PATENT AND TRADEMARK OFFICE
CERTIFICATE OF CORRECTION

PATENT NO. : 5,297,277
DATED : March 22, 1994
INVENTOR(S) : Dein et al

It is certified that error appears in the above-identified patent and that said Letters Patent is hereby corrected as shown below:

In column 8, line 4 (claim 7), change "WRITE command" to --write register--.

In column 8, line 17 (claim 9), after "said" insert --OEMI--.

In column 8, line 28 (claim 11), after "detected" insert --by said logic--.

Signed and Sealed this

Fifteenth Day of November, 1994

Attest:

BRUCE LEHMAN

Attesting Officer

Commissioner of Patents and Trademarks